United States Patent [19]

Barbour

[11] Patent Number: 5,266,111

[45] Date of Patent: * Nov. 30, 1993

[54] CLASS F. FLY ASH CONTAINING SETTABLE COMPOSITION FOR GENERAL PURPOSE CONCRETE HAVING HIGH EARLY STRENGTH AND METHOD OF MAKING SAME

[76] Inventor: Ronald L. Barbour, 3339-K Cir. Brook Dr., SW., Roanoke, Va. 24014

[*] Notice: The portion of the term of this patent subsequent to Feb. 12, 2008 has been disclaimed.

[21] Appl. No.: 959,533

[22] Filed: Oct. 13, 1992

Related U.S. Application Data

[63] Continuation of Ser. No. 652,046, Feb. 7, 1991, abandoned, which is a continuation-in-part of Ser. No. 229,454, Aug. 8, 1988, Pat. No. 4,992,102.

[51] Int. Cl.$^5$ .................. C04B 14/00; C04B 18/00; C04B 2/10

[52] U.S. Cl. .................. 106/709; 106/707; 106/713; 106/737; 106/738; 106/751; 106/763; 106/DIG. 1; 264/DIG. 49

[58] Field of Search ............. 106/645, 709, 751, 763, 106/DIG. 1, 707, 713, 737, 738; 264/DIG. 49

[56] References Cited

U.S. PATENT DOCUMENTS

| | | | |
|---|---|---|---|
| 2,987,408 | 6/1961 | Minnick | 106/705 X |
| 4,210,457 | 7/1980 | Dodson et al. | 106/DIG. 1 X |
| 4,268,316 | 5/1981 | Wills, Jr. | 106/709 X |
| 4,341,562 | 7/1982 | Ahlbeck | 106/707 |
| 4,407,677 | 10/1983 | Wills, Jr. | 106/716 |
| 4,842,649 | 6/1989 | Heitzmann et al. | 106/709 X |
| 4,992,102 | 2/1991 | Barbour | 106/645 |

OTHER PUBLICATIONS

Kosmatka et al. "Design & Control of Concrete Mixes", 13th Edition, 1988, pp. 30-46, 64 and 71.

Proceedings: Eighth International Ash Utilization Symposium, vols. I and II, Oct. 1987, papers 17 and 59.

*Primary Examiner*—Mark L. Bell
*Assistant Examiner*—Michael A. Marcheschi
*Attorney, Agent, or Firm*—William J. Daniel

[57] ABSTRACT

In general purpose concrete compositions, from about 10% but less than about 25% by wt of the usual amount of portland cement for such compositions is replaced with Class F fly ash and cement kiln dust, both abundant and inexpensive waste products, in the weight ratio of such fly ash to cement kiln dust of about 3:1–1:1 with a minimum of about 5% of the replaced portland cement being cement kiln dust. General purpose concrete prepared from these mix compositions exhibit early strength characteristics, especially from day 1 to day 3, generally equal to or better than those exhibited by comparable all portland cement mix compositions.

10 Claims, No Drawings

CLASS F. FLY ASH CONTAINING SETTABLE COMPOSITION FOR GENERAL PURPOSE CONCRETE HAVING HIGH EARLY STRENGTH AND METHOD OF MAKING SAME

CROSS REFERENCE TO RELATED APPLICATIONS

This application is a continuation of U.S. Ser. No. 07/652,046 filed Feb. 7, 1991, now abandoned, which is a continuation-in-part of U.S. Ser. No. 07/229,454, filed Aug. 8, 1988, now U.S. Pat. No. 4,992,102.

BACKGROUND OF THE INVENTION

This invention is concerned with the utilization of two industrial by-products, namely Class F fly ash and cement kiln dust (hereinafter CKD). Fly ash is the very finely divided ash produced by the combustion of antracite and bituminous coal in large industrial coal-fired boilers, especially for the steam generation of electricity, that is suspended in the flue gases from such boilers and is separated therefrom by e.g. electrostatic precipitation. CKD, on the other hand, is a very finely divided dust produced during the manufacture of portland cement in high temperature usually rotary furnaces which is carried off in the flue gases from such furnaces and similarly separated therefrom. Both of these by-products are being generated in enormous quantities in the order of millions of tons per year and are an increasing serious environmental problem. There thus exists an important need for economically effective ways of consuming these otherwise waste materials.

Details as to the nature of Class F fly ash as well as CKD, typical sources of the same and other relevant information are set forth in my co-pending application Ser. No. 07/229,454, filed Aug. 8, 1988, now U.S. Pat. No. 4,992,102 issued on Feb. 12, 1991, the contents of which are incorporated in entirely by reference into this disclosure. That prior application was based on the discovery that if Class F fly ash and CKD are blended together in proper proportions, generally in the range of about 40:60 to 60:40 by wt, the resultant blend meets the requirements set up by ASTM specification C-618-85 for a Class C fly ash. Natural Class C fly ash is derived from the combustion of lignite and subbituminous coals which are available in certain limited regions of the United States and is known to possess more desirable properties than Class F fly ash is are consequently recognized as a substantially more valuable commodity. In effect, the combustion of CKD in judicious amounts with Class F fly ash according to the prior disclosure upgraded the Class F fly ash to the Class C fly ash category, as characterized by ASTM Standard C-618-85, creating a "synthetic" Class C fly ash blend. The details of ASTM C-618-85 appear in my prior application identified above.

That prior application was also concerned with the use of the new "synthetic" Class C fly ash blend as an effective replacement for portland cement in all purpose or general purpose concrete mixes, whether prepared in bulk, as ready mixes or in bags. Thus, replacement of at least about 25% up to about 50% by wt of portland cement in otherwise conventional general purpose concrete mixes, up to a maximum of about 200 lbs in certain high strength mixes, yielded a general purpose concrete exhibiting a compression strength (the most important property of general purpose concrete) substantially comparable to corresponding all-portland cement mixes and substantially greater than exhibited by similar mixes containing lesser amounts, e.g. 20 by wt., of Class F fly ash alone, i.e. absent any CKD. Since both Class F fly ash and CKD were available at a fraction of the cost of portland cement, this result had an obvious economic appeal, apart from the potential environmental benefit of disposing of considerable quantities of major waste products.

The emphasis of the prior application was on utilizing as much of the Class F fly ash and CKD as possible, thereby maximizing both the favorable cost and environmental consequences, which led to the selection of a minimum replacement level for portland cement of about 25% by wt. Further experience with the inclusion of these materials in general purpose concrete mixes has established that a lesser replacement, i.e. below about 25% by wt, of the portland cement in such mixes is also advantageous. One would naturally expect that with increasing amounts of portland cement, the levels of compression strength in the general purpose concrete produced from such mixes would remain high. What was unexpected in the results achieved with mixes containing a lesser amount than 25% by wt of Class F fly ash and CKD together has been an impressively high level of early compression strength, that is the compression strength exhibited by the general purpose concrete during the period immediately following pouring of the same, especially day 1 through day 3, and even up to day 7, which even exceeded the values observed in corresponding all portland cement mixes.

Virtually always, general purpose concrete is poured within forms or frames for support thereby until the concrete hardens to a sufficient degree to permit the forms to be removed. For most construction work with general purpose concrete, economic considerations demand that the forms be removed as soon as possible so that they can be moved to the next location at the site for the next pouring. For building construction, this may be the next floor to be erected on top of the previous floor so that the latter must possess sufficient strength to support new floor above it. The forms cannot, therefor, be moved until adequate development of strength is assured. The collapse during construction of buildings constructed of concrete due to premature removal of the construction forms before adequate strength development is an occasional occurrence, sometimes of a disastrous nature, in the building field. High early strength portland cements have been developed to address this problem, being identified as ASTM Type III cement, but they tend to be more expensive.

As set forth in the prior application, the incorporation of Class F fly ash in concrete was up to about a 20% replacement level of the portland cement is often permissible under local construction regulations. But it is widely recognized that this practice significantly impairs the early strength of the resultant concrete. As shown by Lea, "The Chemistry of Cement and Concrete", copyright 1971, Chemical Publishing Company, New York, N.Y., at Page 437 and 438, when 20% by wt portland is replaced by "pulverized fuel ash", the author's synonym for fly ash, the 7-day strength is reduced by 10–30%, while the 1-day and 3-day values are at least equally impaired if not somewhat worse. While the strength of the concrete is usually recovered over time, i.e. from about 90 days to one year, this is of little or no consolation where high early strength is critical. It appears to be quite unexpected that the combination of CKD with Class F fly ash for replacing less than 25% portland cement can at least substantially compensate for normal propensity of Class F fly ash to materially reduce the early strength in concrete containing the same in comparable amounts and in certain proportions to actually over compensate for the strength loss and impart higher early strengths than for corresponding all portland cement mixes. While the use of smaller amounts of these waste products cannot offer the promise of consuming as much of the available supplies as did the prior concept, it does extend that consumption into otherwise unavailable areas of use and may therefore contribute additionally to their beneficial utilization.

SUMMARY OF RELEVANT PRIOR ART

The relevant prior art is that described in the prior application and for convenience that description is incorporated below.

Dodson, et al. in U.S. Pat. No. 4,210,457, while recognizing the accepted limit of 20% replacement with fly ash of the portland cement in concrete mixes, proposed the substitution of larger amounts, preferably 50% or more, of the portland cement with particular selected natural fly ashes having a combined content of silica, alumina and ferric oxide content, less than 80% by weight, and a calcium oxide content exceeding 10%, based on five samples of such ashes, varying from about 58–72% combined with a calcium oxide range of about 18–30%. Six other fly ash samples which are not suitable at the high replacement levels of 50% or more were shown to vary in the combined oxide content from about 87–92% and in calcium oxide content from about 4 to about 8%. Evaluating these values against the ASTM C618-85, one observes that the acceptable fly ashes came under the Class C specifications, while the unacceptable ashes fell in the Class F specification. Thus, this patent in effect establishes that natural Class C fly ashes are suitable for substantially higher levels of replacement for portland cement in concrete mixes than are Class F fly ashes, and this capacity is now generally recognized, with Class C fly ashes being generally permitted up to about a 50% replacement level while maintaining the desirable physical properties of the concrete especially compressive strength.

In U.S. Pat. No. 4,240,952, Hulbert, et al. while also acknowledging the generally recognized permissible limit of Class F fly ash replacement for portland cement of 20%, proposed replacement of at lest 50% up to 80%, provided the mix contained as special additives about 2% of gypsum and about 3% of calcium chloride by weight of the fly ash. The fly ash described for this purpose, however, was a natural Class C fly ash analyzing about 28% calcium oxide and combined silica, alumina and ferric oxide content of about 63%. With up to 80% of this fly ash and the specified additives, compressive strengths comparable to straight portland cement were said to be generally achievable. In one example using 140 pounds portland cement and 560 pounds of fly ash (80-20 ratio) with conventional amounts of coarse and fine aggregate, and water and including the requisite additives, compressive strengths tested at 3180 psi for 7 days, 4200 psi for 14 days and about 5000 psi at 28 days.

Obviously, the above patents cannot contribute to a solution to the disposal problem for Class F fly ash. In U.S. Pat. Nos. 4,018,617 and 4,101,332, Nicholson proposed the use of mixtures of fly ash (apparently Class F in type), cement kiln dust and aggregate for creating a stabilized base supporting surface replacing conventional gravel or asphalt aggregate stabilized bases in road construction wherein the useful ranges were fly ash 6–24%, CKD 4–16% and aggregate 60–90%, with 8% CKD, 12% fly ash and 80% aggregate preferred. Compressive strength values for such measures as revealed in the examples varied rather erratically and generally exhibited only small increases in compression strength over the 7–28 day test period. Among the better results were for the preferred mixture wherein the values increased from about 1100 psi at 7 days to 1400 psi at 28 days. The addition of a small amount of calcium chloride added about a 200 psi increment to these values. On the other hand, the addition of 3% of lime stack dust recovered from a lime kiln significantly reduced the results to about 700 psi at 7 days to 900–1300 psi at 28 days. Elimination of the aggregate reduced the strength to a fraction of the values otherwise obtained, a mixture of 12% CKD and 88% fly ash alone showing strength values of only about 190–260 psi over the 28 day teste period. Similarly, the choice of a finely divided aggregate such as fill sand resulted in about the same fractional level of strength values in the range of about 140–230 psi. A combination of finely divided and coarse aggregate in approximately equal amounts reduced the compressive strength values by about ½ with virtually no change over the test period, giving values ranging from 650–750 psi, except where 1% of Type 1 portland cement was included which restored the strength values to about their general level, except at the initial 7 days period where the strength values were about 800–900 psi, increasing at 28 days to about 1200–1600 psi. Curiously, the best strength results were attained when 11.6% fly ash was combined with 3.4% lime with the balance crushed aggregate, the CKD being omitted entirely, for which the strength values while starting at a lower level of about 850–950 at 7 days increased to about 1700 psi at 28 days.

The combination of fly ash and lime stack dust incidentally mentioned in the later patent was explored further by Nicholson in U.S. Pat. No. 4,038,095 which concerns mixtures of about 10–14% fly ash, about 5–15% lime stack dust with the balance aggregate in the range of 71–85%. Somewhat inexplicably, the compressive results reported here for such mixtures do not reach the high level specified in the first two patents, the strength values specified being only about 1000 psi with the more general levels well below that depending on particular proportions.

In U.S. Pat. No. 4,268,316, Wills discloses the use of mixtures of kiln dust and fly ash as a replacement for ground limestone and gypsum for forming a mortar or masonry cement, using proportions of about 25–55% portland cement, about 25–65% CKD and 10–25% fly ash. When these mortar formulations were mixed with damp sand in the proportions of about one part cement mixture to 2.5–3 parts sand, compression strengths comparable to those of standard masonry cement composed of 55% cement clinkers 40% limestone and 5% gypsum were shown for mixtures containing 50% cement, 24–40% CKD and 15–25% fly ash. Inexplicably, in one example, when the cement content was increased to 55% with 35% CKD and 10-% fly ash, the compressive strengths dropped by about 30–40% at both the 7 day and 28 day ages to levels inferior to the standard material. As the cement content was decreased, with corresponding increases in the CKD, the compressive strength values dropped drastically. On the other hand, in another similar example mixtures containing 55% cement, 35% CKD and 10% fly ash proved superior, particularly at the 28 day age, in compressive strength, to mixtures containing 50% cement, 35% fly ash and 15% CKD as well as other standard masonry cements containing 50% cement, 47% limestone and 3% gypsum. Indeed, strength values dropped about 40% for the mixtures having a 5% reduction in cement and a corresponding 5% increase in the fly ash to values definitely inferior to the standard cements. Similar variations were shown under laboratory test conditions for comparable 50/35/15 mixtures dependent on the source of the fly ash while under actual construction conditions for the same mixtures, compressive strength values were reduced by about 50% for both the conventional masonry cement containing 55% portland cement and comparable mixtures within the patented concept. The fly ash here was preferably Class F with Class C materials being less desirable.

In U.S. Pat. No. 4,407,677 Wills went on to teach that in the manufacture of concrete products such as blocks or bricks, the fly ash usually employed in combination with portland cement therein could be replaced in its entirety by CKD with modest improvement in early compressive strength values for such products. Thus, at one day and two day tests compressive strength values were shown of about 500–800 psi, but were said to increase to about 1200 psi after 28 days. The mixes disclosed here contained 0.4–0.9 parts cement, about 0.1–0.6 parts CKD and 10–12 parts aggregate combining both fine and coarse materials, such as expanded shale and naturel sand in a weight ratio of 80/20. Masonry cements generally develop at least about 95% of their strength properties at 28 days age so that additional aging of the patented products would not be expected to result in any significant increase in their compressive strength values.

In a different vein, an improved highly activated fly ash is obtained by Minnick in U.S. Pat. No. 3,643,115 by injecting lime together with bituminous coal into the combustion boiler to give a synthetic fly ash developing early strength as high as five times that obtained conventionally. The improved highly active fly ash can be mixed in proportions of 80–90 parts with 5–87 parts aggregate and 5–30 parts water. The injected lime combines with the sulfur dioxide released during combustion of the coal, and additional sulfur may be needed if the coal has insufficient sulfur, giving a fly ash having a considerably increased sulfate content as well as calcium oxide and magnesium contents.

Obviously, the achievement of high early strength in concrete mixes containing fly ash therein is an important goal of those workers active in the field.

OBJECTS OF THE INVENTION

The primary object of the invention is an all or general purpose concrete mix for producing general purpose concrete exhibiting high early strength in which at least about 10% but less than 25% by wt of the usual amounts of portland cement therein is replaced with Class F fly ash and CKD in the weight ratio of about 3:1–1:1.

Another object is a general purpose concrete mix containing cementitious material, large and small aggregate and optimal other constituents in the conventional ranges of proportions in which the cementitious material consists essentially of more than about 75% up to about 90% portland cement and at least about 10% up to less than about 25% by wt of Class F fly ash and CKD, the amounts of the fly ash and CKD having a weight ratio of about 3:1–1:1.

DETAILED DESCRIPTION OF THE INVENTION

Any of the usual or common Class F fly ash may be employed in the practice of this invention as can any usual or common cement kiln dusts. For further details as to the origination, preferred sources and composition of these materials, reference may be had to the detailed description of the prior application Ser. No. 07/229,454. It will be understood that the composition criteria imposed upon the synthetic Class C fly ash blends of the prior invention in order to satisfy the somewhat arbitrary specification of ASTM C-618-85 for a Class C fly ash are not necessarily applicable here since the present invention is not focused on a synthetic Class C fly ash blend fitting that specification.

It follows that the Class F fly ash and CKD hereof need not be blended together before being admixed with the other ingredients although preliminary blending is permissible if desired. Rather, the order or sequence of combining ingredients can be varied in accordance with the usual practice in formulating general purpose concrete mixes while the mixing techniques can be any of those common in the concrete mix industry.

The lower limit on the quantity of the portland cement replaced is not hard and fast but is determined mainly by practical consideration. Thus, at least 10% by wt of the cement should be replaced in order to make the substitution economically worthwhile, e.g., in view of the extra storage and handling expense, even though a correspondingly reduced benefit would nevertheless be obtained at levels below this limit. If about 25% or more of the cement is replaced, the good early strength behavior of the resultant concrete begins to suffer appreciably. Hence, in order for the desired sufficient early strength to develop the maximum amount of cement replaced should be less than about 25%.

It is important that enough of the CKD be present to overcome the tendency of the fly ash otherwise to impair early strength development. On the other hand, too much of the CKD is equally undesirable, causing too high an alkalinity in the eventual concrete. An upper limit of about 1:1 for the weight ratio of fly ash to CKD achieves the latter requirement while a lower limit of about 3:1 achieves the former one. However, to ensure an adequate content of CKD especially at lower cement replacement levels, a minimum amount of CKD equal to around a 5% replacement level for the CKD alone should be provided. For example, at a 10% replacement level, the Class F fly ash and CKD would be used in about equal quantities, i.e. each replaces about 5% by wt, while at higher replacement levels of say 15–20%, the fly ash can predominate, e.g., 10% fly ash and 5% CKD or 15% fly ash and 5% CKD. For optimum results, roughly equal amounts are preferred even at higher replacement levels, 10% fly ash and 10% CKD giving particularly good results.

Apart from the incorporation of Class F fly ash and CKD within the limits specified above, the formulation of the general purpose concrete mixes of the invention follows the usual lines, i.e. is otherwise conventional. As a general guideline, the following general description is applicable. Ordinarily, general purpose concrete mixes contain per cubic yard portland cement in the range of about 400–750# before any replacement thereof with Class F fly ash and CKD according to the invention, covering the range in the jargon of the trade of about a "4.0 bag" mix to an "8.0 bag" mix, a bag of portland cement weighing 94 lbs. Concrete with less than about 400 lb portland cement tends to be quite weak and has only limited usefulness. On the other hand, concretes containing per cubic yard more than 750 lbs of cement are known but are specialized products exhibiting extremely high levels of compressive strength and specialized knowledge is needed in the formulation and utilization of such mixes.

The amount of the coarse aggregate used in general cement would be in the rage of about 1600–2000#, dependent mainly with the so-called fineness module of the fine aggregate as determined by the supplier thereof and applying an established American Concrete Industry (ACI) correlation. This weight range is based on a unit weight of coarse aggregate of $100\#/ft^3$, a fineness module of 2.4–2.7 and a volume % of coarse aggregate per $yard^3$ of concrete of 0–/5–0.7 for a maximum aggregate size of $\frac{1}{8}$–1". Coarse aggregate can vary in unit weight generally within a range of $90$–$100\#/ft^3$ and the above range can vary accordingly about ±10%. The amount of the water needed for admixture with such mixes to make good concrete would vary between about 40–70% by weight of the total of cementitious materials present including the Class F fly ash and CKD of the invention. As the examples show, the inclusion of small amounts of optional additives is customary, particularly such additives as air entraining agents and water reducing agents, all of which are known and need no further description here. After the collective amount of these several materials has been determined, the balance of the mix to make one cubic yard is constituted by the fine aggregate such as sand, and this amount is adjusted to reflect changes in the quantities of the other ingredients. That is, the total absolute volume of all ingredients other than fine agqregate, including the volume of air allocated by the design specification for entrained air, is subtracted from 27 $ft^3$ to give the $ft^3$ to be supplied by fine aggregate. The difference in $ft^3$ can be converted to weight by multiplying it by the specific gravity of the fine aggregate times the $wt/ft^3$ of water (62.4#). It will, of course, be understood that the dosage rates specified in the examples to follow, particularly for the additives such as the air entraining agent, etc., may need slight adjustment due to changes in temperature and other local factors for use in actual practice.

In formulating specific mixes for concrete construction, reference should be made to the procedures established therefor by the American Concrete Industry (ACI). As is well known by those knowledgeable in the area, ACI concrete design mixes are calculated on an absolute volume basis to give a cubic yard or 27 $ft^3$ of the desired concrete. By absolute volume is meant the theoretical volume of each constituent of the mix relative to the volume of 1 $ft^3$ of water. By knowing specific gravity of each of the various constituent materials, one can readily calculate the absolute volume thereof independently of actual density variations. In the industry, concrete mixes are arbitrarily identified in terms of certain even-numbered levels of compression strength, such as a "3000# concrete", a "4000# concrete", etc. By usage, the actual concrete rated at the respective levels is expected to possess an actual compressive strength substantially higher, usually by an increment of about 1200 psi, than the rated level, Thus, a "3000# concrete" would be expected to have an actual compression strength of at least 4200 psi, while a "6000# concrete" would have an actual compression strength of at least 7200 psi. The industry also refers to cement mixes in terms of the number of bags of portland cement, each of 94 lb. weight, that would be utilized to give a cubic yard of the mix, the bag number being known from experience to have a rough correlation with a given compression strength. Thus, a "4 bag mix" would roughly equate with a "2500# concrete" and a "7.5 bag mix" with a "6000# concrete". This correlation is only general at best since the actual compression strength exhibited by any specific concrete mix design can only be determined by actual experimental testing.

The other materials than the Class F fly ash and CKD for the present mixes may be selected based on the experience of the art taking into account the nature of the construction for which they are intended.

The choice of aggregate material will pose no problem to the person skilled in the design of such mixes. The coarse aggregate should have a minimum size of about $\frac{3}{8}$ inch and can vary in size from that minimum up to one inch or larger, preferably in gradations between these limits. Crushed limestone, gravel and the like are desirable coarse aggregates, and the material selected in any case should exhibit a considerable hardness and durability inasmuch as crumbly, friable aggregates tend to significantly reduce the strength of the ultimate concrete. The finely divided aggregate is smaller than $\frac{3}{8}$ inch in size and again is preferably graduated in much finer sizes down to 200 sieve size or so. Ground limestone, sand and the like are common useful fine aggregates.

Several different types of portland cement are available and all are in principle, useful. Type I is the general purpose variety and is most commonly employed but Type II can be substituted if extremely high early strength development is desirable. Type III is also useful but tends to retard strength development somewhat. Commercial blended cements, such as Type I-P, wherein 20% Class F fly ash is blended with 80% by weight portland cement clinker during pulverization should be avoided.

EXAMPLES

In order to demonstrate in an actual general purpose concrete mix the results obtained in accordance with the invention at different levels of replacement and different weight ratios of Class F fly ash and CKD, one general purpose mix was designed following the ACI procedure summarized above with various combination of cementitious materials as identified, the several formulations were made into general purpose concrete and the resultant concretes were tested for compression strength after 1 day and 3 days setting time respectively according to industry standards. The make up of the compositions in question and the results of the test are summarized in the following tabulation.

EXAMPLES 1–6

General Purpose Concentrate Mixes

Materials Used
Roanoke Cement Co. Portland Cement, Type I
Roanoke Cement. Co. Cement Kiln Dust
Carbo Fly Ash
W. R. Grace WRDA (Hycol) Water Reducer
Rockydale Concrete Sand, Size #4 to #200

Rockydale No. 68 Stone, Size ⅜ to #16

TEST DATA ON AGGREGATES

| Sieve size | Fine Aggregate Rockydale Sand (Percent Passing) | Coarse Aggregate Rockydale #58 (Percent Passing) |
| --- | --- | --- |
| 1" | | 100.0 |
| ¾" | | 99.5 |
| ½" | | 51.0 |
| ⅜" | 100.0 | 16.0 |
| #4 | 99.8 | 2.3 |
| #8 | 98.4 | 1.8 |
| #16 | 54.3 | 1.6 |
| #30 | 26.0 | |
| #50 | 13.7 | |
| #100 | 7.5 | |
| #200 | 4.8 | |
| Fineness Modulus | 3.00 | — |
| Absorption, percent | 0.8 | 0.5 |
| Specific Gravity LS1 2.64 Castle | 2.81 | 2.82 |
| Dry rodded Unit Weight, pcf | — | 99.1 |

TABLE I

| | Exam 1 C-100[1] | Exam 2 C-80/20[1] | Exam 3 C-90/5/5 | Exam 4 C-80/10/10 | Exam 5 C-80/15/5 | Exam 6 C-85/10/5 |
| --- | --- | --- | --- | --- | --- | --- |
| MIX DESIGN PROPORTIONS | | | | | | |
| Portland Cement, Type I, lbs. | 470 | 370 | 423 | 376 | 376 | 400 |
| Cement Kiln Dust, lbs. | 0 | 0 | 24 | 47 | 70 | 47 |
| Carbo Fly Ash, lbs. | 0 | 94 | 24 | 47 | 24 | 24 |
| WRDA (Hycol) Water Reducer, ozs. | 18.8 | 18.8 | 18.8 | 18.8 | 18.8 | 18.8 |
| Rockydale #68 Stone, lbs. | 1650 | 1650 | 1650 | 1650 | 1650 | 1650 |
| Rockydale Concrete Sand, lbs. | 1664 | 1664 | 1664 | 1664 | 1664 | 1664 |
| Water-Cement Ratio (all cementitious materials) | 0.74 | 0.72 | 0.72 | 0.72 | 0.72 | 0.72 |
| Slump, inches | 3.75 | 4.0 | 3.25 | 3.5 | 3.5 | 3.5 |
| Temperature of Concrete, F. | 61 | 63 | 63 | 63 | 63 | 63 |
| Temperature of Air, F. | 57 | 58 | 58 | 58 | 58 | 58 |
| Unit Weight, pcf | 153.4 | 153.7 | 153.3 | 152.4 | 152.7 | 153.4 |
| COMPRESSIVE STRENGTH TEST RESULTS, (psi) | | | | | | |
| 1-day Test Result | 937(100)[2] | 884(94.3) | 1096(117.0) | 1203(128.4) | 990(105.7) | 1043(111.3) |
| 3-Day Test Results | 2476(100) | 2228(90) | 2759(111.4) | 2476(100.0) | 2405(97.1) | 2335(94.3) |

[1]/Examples 1 and 2 are comparative examples for 100% portland cement and 80% portland cement and 20% Class F fly ash (no CKD) respectively.
[2]/Parenthetical values are percentages relative to Example 1 as 100%.

EXAMPLES 7-11

In order to evaluate under controlled laboratory conditions, the effects at various intervals on the compressive strength characteristics of test samples produced from mixes containing along with portland cement differing levels of Class F fly ash and CKD in varying proportions compared with similar test samples from mixes containing only portland cement and cement plus the fly ash alone, the test procedure ASTM C-109 for mortar cube compressive strength was followed. According to Lea, supra, at Page 368, ASTM C109-64 covers the test for compressive strength on 2" cubes made from a 1:2.75 graded sand mortar with about 13–14% water. This type of test does not compare with tests similar to Examples 1–6 above based on actual general purpose concrete mix design and the results therefrom cannot be extrapolated to predict the behavior of actual concrete mixes under actual conditions. The results nonetheless do provide a direct comparison of compression strength variations of the various combinations of ingredients tested. Example 7 is a control using 100% portland cement while Example 8 is a comparative example illustrating the compressive strength impairment due to the inclusion of Class F fly ash alone.

In each of Examples 8–11, the unspecified balance of the cementitious ingredients is portland cement.

TABLE II

ASTM C-109 Mortar Cube Compressive Strength Results (psi)

| Cementitious Ingredients | 1 Day | 3 Day | 7 Day | 28 Day |
| --- | --- | --- | --- | --- |
| Exam 7 Control | 2590(100)[1] | 4250(100) | 4980(100) | 6090(100) |
| Exam 8 20% fly ash | 2080(80) | 2590(85) | 4100(82) | 5450(90) |
| Exam 9 5% fly ash 5% CKD | 2780(107) | 4590(108) | 4990(100) | 6310(104) |
| Exam 10 10% fly ash 5% CKD | 2640(102) | 4450(105) | 4920(99) | 6260(103) |
| Exam 11 15% fly ash 5% CKD | 2470(95) | 4100(96) | 4990(100) | 6050(99) |

[1]/Parenthetical values are percentages relative to control as 100%.

What is claimed is:

1. In a settable composition for producing general purpose concrete which comprises per cubic yard of the concrete to be produced a generally homogeneous admixture of about 400–750 lbs. portland cement, up to minor amounts of conventional concrete additives, and a mixture of coarse and fine aggregate suitable for general purpose concrete containing about 1600–2000 lbs. coarse aggregate of a size of at least about ⅜ inch, and sufficient fine aggregate of a size less than ⅜ to yield one cubic yard when the admixture is combined with water in an amount equal to about 40–70% by weight of said portland cement, the improvement wherein said portland cement is partially replaced with a) Class F fly ash and b) cement kiln dust, said fly ash and cement kiln dust being present in amounts which when combined equal at least about 10% but less than about 25% by weight of said portland cement and have a weight ratio of about 3:1–1:1 with a minimum of about 5% by wt of said portland cement being replaced by said cement kiln dust and the balance of the replaced portland being said fly ash.

2. The composition of claim 1 wherein said coarse aggregate has a size up to about 1".

3. The composition of claim 1 wherein about 15–20% by wt of said portland cement is replaced.

4. The composition of claim 1, wherein said fly ash and cement kiln dust are present in a weight ratio of about 2:1–1:1.

5. The composition of claim 1, wherein said fine aggregate is graduated in size from about #100 up to about #4 sieve size and said coarse aggregate is graduated in size from about ⅜" up to at least about ¾" size.

6. A settable composition for producing general purpose concrete which comprises per cubic yard of the concrete to be produced a generally homogeneous admixture of about 400-750 lbs. cementitious ingredients, up to minor amounts of conventional concrete additives, and a mixture of coarse and fine aggregate suitable for general purpose concrete containing about 1600-2000 lbs. coarse aggregate of a size of at least about ⅜ inch, and sufficient fine aggregate of a size less than ⅜ to yield one cubic yard when the admixture is combined with water in an amount equal to about 40-70% by weight of said cementitious ingredients, said cementitious ingredients consisting essentially of more than about 75% up to about 90% by wt of portland cement and at least about 10% but less than about 25% by wt of Class F fly ash and cement kiln dust, the weight ratio of said Class F fly ash to said cement kiln dust being in the range of about 3:1-1:1 with a minimum of about 5% of the replaced cement being cement kiln dust.

7. The composition of claim 6 wherein said coarse aggregate has a size up to about 1".

8. The composition of claim 6 wherein said fly ash and cement kiln dust are present in the combined amount of about 15%-20% by wt.

9. In a method of mixing general purpose concrete which comprises the step of mixing concrete-making ingredients comprising 400-750 lbs portland cement, up to minor amounts of conventional concrete additives, and a mixture of coarse and fine aggregates suitable for general purpose concrete containing about 1600-2000 lbs coarse aggregate of a size of at least about ⅜ inch, and sufficient fine aggregate of a size less than ⅜ to yield one cubic yard when the admixture is combined with water equal to about 40-70% by weight of said portland cement, pouring the resultant mixture into a form, and allowing the poured mixture to harden to form general purpose concrete, the improvement of partially replacing said portland cement being so mixed with Class F fly ash and cement kiln dust, said fly ash and cement kiln dust being present in amounts which when combined equal at least about 10% but less than about 25% by weight of said portland cement and have a weight ratio of said fly ash to said cement kiln dust is in the range of about 3:1-1:1 with a minimum of 5% of the replaced cement being cement kiln dust.

10. The method of claim 9, wherein said fine aggregate is graduated in size from about #100 up to about #4 sieve size and said coarse aggregate is graduated in size from about ⅜" up to at least about ¾" size.

* * * * *